(12) United States Patent
Flagler et al.

(10) Patent No.: US 10,188,045 B1
(45) Date of Patent: Jan. 29, 2019

(54) APPARATUS, SYSTEM AND METHOD FOR ERADICATING SOIL-BORNE PESTS USING VARIABLE CONTROLLED ELECTRIC CURRENT

(71) Applicant: David Michael Flagler, Selma, CA (US)

(72) Inventors: Walter George Flagler, Kingsburg, CA (US); David Michael Flagler, Selma, CA (US)

(73) Assignee: David Michael Flagler, Selma, CA (US)

( * ) Notice: Subject to any disclaimer, the term of this patent is extended or adjusted under 35 U.S.C. 154(b) by 0 days.

(21) Appl. No.: 15/667,595

(22) Filed: Aug. 2, 2017

(51) Int. Cl.
| | |
|---|---|
| *A01G 7/04* | (2006.01) |
| *A01M 3/02* | (2006.01) |
| *A01B 47/00* | (2006.01) |
| *A01B 49/04* | (2006.01) |
| *A01B 15/02* | (2006.01) |

(52) U.S. Cl.
CPC .............. *A01G 7/04* (2013.01); *A01B 15/025* (2013.01); *A01B 47/00* (2013.01); *A01B 49/04* (2013.01); *A01M 3/025* (2013.01)

(58) Field of Classification Search
USPC ............... 47/1.3, DIG. 10, DIG. 12, 58.1 R; 43/140, 144, 124, 132.1, 98
See application file for complete search history.

(56) References Cited

U.S. PATENT DOCUMENTS

| | | | |
|---|---|---|---|
| 2,429,412 A | 10/1947 | Keller | |
| 2,588,561 A | 3/1952 | Opp et al. | |
| 2,750,712 A | 6/1956 | Rainey | |
| 3,307,289 A | 3/1967 | Lemm | |
| 3,559,337 A | 2/1971 | Marcoux et al. | |
| 3,919,806 A | 11/1975 | Pluenneke et al. | |
| 4,094,095 A | 6/1978 | Dykes | |
| 4,257,190 A | 3/1981 | Dykes | |
| 4,428,150 A | 1/1984 | Geirsbach et al. | |
| 4,758,318 A | 7/1988 | Yoshida | |
| 5,141,059 A | 8/1992 | Marsh | |
| 5,271,470 A | 12/1993 | King et al. | |
| 5,435,096 A * | 7/1995 | Nekomoto ............ | A01M 1/223 43/112 |
| 5,663,649 A * | 9/1997 | Topp ...................... | E02D 1/027 324/643 |

(Continued)

*Primary Examiner* — Andrea M Valenti
(74) *Attorney, Agent, or Firm* — Richard A. Ryan

(57) ABSTRACT

An apparatus, method and system for eradicating soil-borne pests in soil utilizing leading and trailing rows of shanks, a source of electricity and a mechanism to determine the condition of the soil being treated. The leading row has ripper shanks that open a path through the soil and the trailing row has specially configured electrically conductive stinger shanks, connected to the source of electricity, that discharge electricity into the soil to electrocute pests. The soil condition determination mechanism comprises one or more soil probes in a probe row disposed between the leading and trailing rows. The soil probe reads the condition of the soil in the path cut by the ripper shanks and transmits a signal to a voltage controller that is connected to the source of electricity to adjust the output thereof to the stinger shanks to automatically compensate for changing soil conditions to effectively and efficiently eradicate pests.

19 Claims, 8 Drawing Sheets

(56) References Cited

U.S. PATENT DOCUMENTS

| | | | | |
|---|---|---|---|---|
| 5,841,282 A | * | 11/1998 | Christy | A01B 79/005 |
| | | | | 111/118 |
| 6,237,278 B1 | | 5/2001 | Persson et al. | |
| 2003/0150156 A1 | * | 8/2003 | Flagler | A01B 47/00 |
| | | | | 47/1.3 |
| 2008/0046130 A1 | * | 2/2008 | Faivre | A01G 25/092 |
| | | | | 700/284 |
| 2010/0032493 A1 | * | 2/2010 | Abts | A01G 25/092 |
| | | | | 239/11 |
| 2011/0203356 A1 | * | 8/2011 | Scherbring | G01N 3/40 |
| | | | | 73/84 |
| 2016/0183484 A1 | * | 6/2016 | Richings, Sr. | A01G 25/167 |
| | | | | 239/11 |
| 2016/0366842 A1 | * | 12/2016 | Guy | A01G 25/167 |

\* cited by examiner

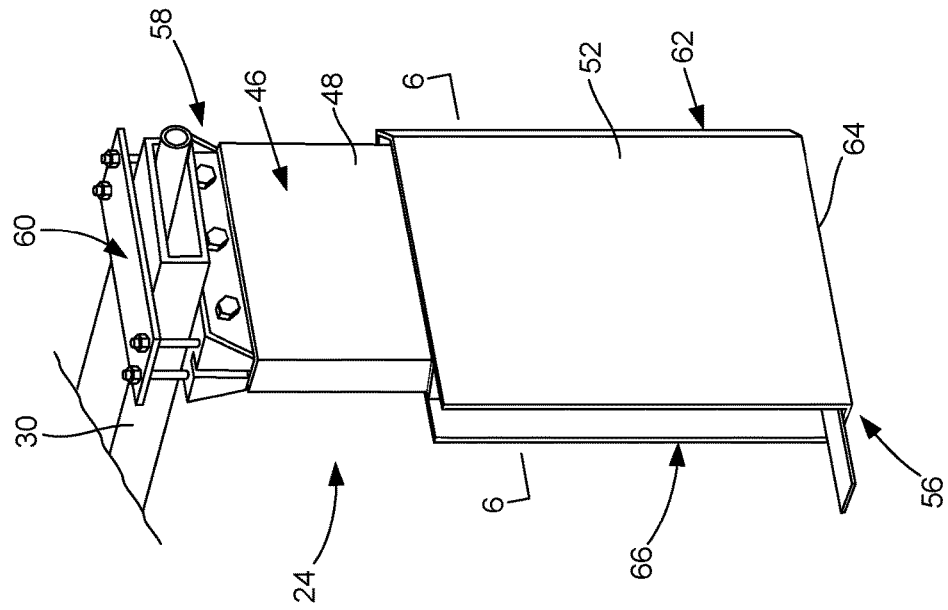
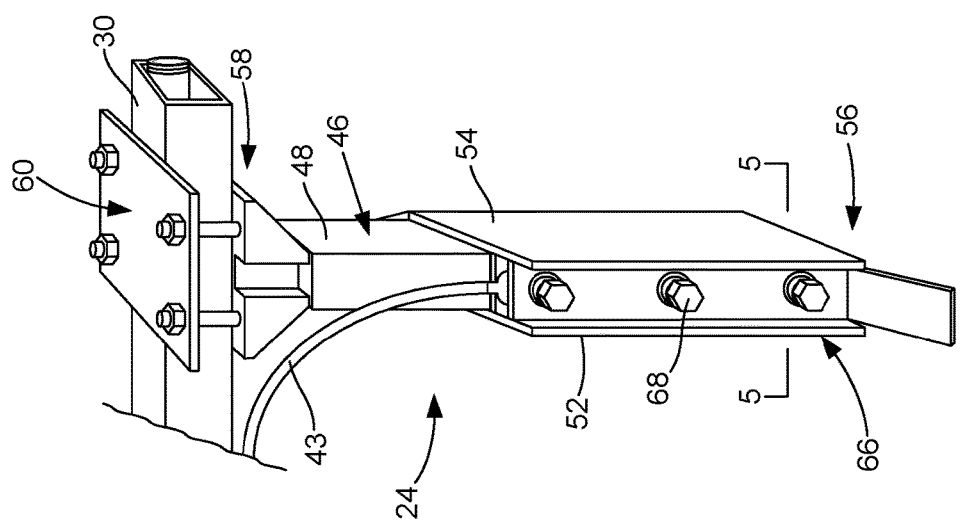

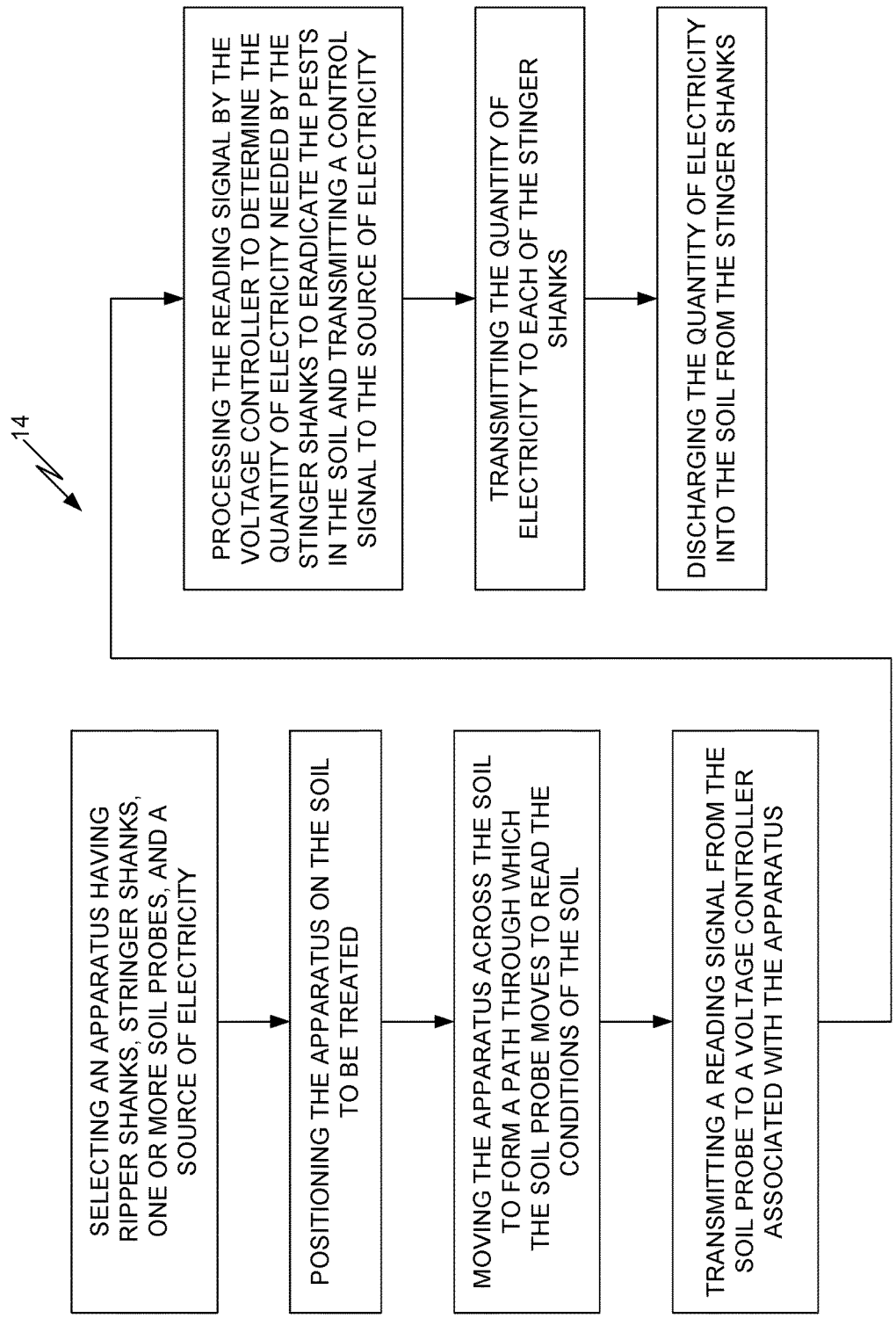

APPARATUS, SYSTEM AND METHOD FOR ERADICATING SOIL-BORNE PESTS USING VARIABLE CONTROLLED ELECTRIC CURRENT

CROSS-REFERENCE TO RELATED APPLICATIONS

None.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The present invention relates generally to apparatuses, methods and systems that are utilized to improve agricultural soils for planting crops. More particularly, the present invention relates to apparatuses, methods and systems that apply electrical current to the soil to eradicate the harmful pests, including nematodes and other soil-borne organisms, in the soil prior to planting crops therein to protect the cultivated crops from the deleterious effects that would otherwise be caused by these pests. More particularly, the present invention relates to such apparatuses, methods and systems that are configured to vary the electrical current applied to the soil based on the moisture content of the soil.

B. Background

As well known in the agricultural industry, it is important to eradicate harmful soil-borne pests from agricultural fields prior to planting crops therein. Without such eradication, nematodes and other organisms that are commonly found in the soil may affect, delay or even prevent the subsequently introduced plants from proper growth. In general, the deeper the eradication treatment penetrates the soil, the longer the pest-free head start that is provided to the plants which are subsequently introduced into the soil. Conventional methods of pest eradication involve spraying or fumigating the soil with methyl bromide or other similarly toxic chemicals. As well known, the application of such toxic chemicals has generally become highly restricted, or even illegal with regard to some chemicals and/or in some jurisdictions, such that growers must utilize alternative systems and methods for pre-planting eradication of pests.

A number of weed and pest eradication apparatuses have been developed in the prior art that use electricity for pest eradication purposes. The known weed eradication apparatuses generally rely upon touching the above-ground portions of growing weeds (leaves or stems) with electrically charged conductors for eradication purposes. Other apparatuses utilize structures that penetrate the soil to eradicate the soil-borne pests, including nematodes and the like. However, existing soil electrification apparatuses generally suffer from one or more drawbacks, as set forth below, that have substantially limited widespread utilization of such apparatuses. An example of one such apparatus is set forth in U.S. Pat. No. 2,429,412 to Keller, which describes a system for applying electrical treatment to the soil in order to destroy pestiferous organic matter, as well as sterilize and cultivate the soil. The '412 Patent describes an apparatus that includes a generator and transformer connected to a box-like structure containing electrically conductive plates that penetrate the soil as the structure is pulled through a field. Because this apparatus does not have a separate or leading soil ripper to cut into the soil, the horizontally oriented electrical plates located at the bottom of the box structure must themselves tear open the soil. As would be expected, this results in significant wear and tear on the plates and is likely to lead to more frequent repair and/or replacement of these plates. In addition, the box-like structure containing the electrical conductors is small and provides very shallow soil treatment, and the top of the box structure must be kept in contact with the soil surface to provide proper conductivity, which appears difficult to maintain. U.S. Pat. No. 2,588,561 to Opp, et al. applies electricity to the soil through a series of cultivation discs having conductive rings which are alternately charged in sequence. However, the discs do not provide deep soil treatment since less than half of their diameter penetrates the soil, and the conductive rings do not provide broad or complete electrical coverage especially since they only come into contact with loosened soil. Moreover, the conductive rings must constantly be replaced since they are part of the soil cultivation structure, and because they tend to deteriorate after prolonged contact with the soil. U.S. Pat. No. 4,758,318 to Yoshida and U.S. Pat. No. 6,237,278 to Persson, et al. suffer from similar drawbacks in that the conductive discs of these inventions are shallow and must themselves break the soil, leading to incomplete electrical coverage through contact with loosened soil.

U.S. Publication No. 2003/0150156 to the present inventors, the disclosure of which is hereby incorporated by this reference as though fully set forth herein, describes an improved apparatus for applying electrical current to soil to eradicate soil-borne pests therein. The apparatus has specially-shaped electrically conductive metal stinger shanks that are pulled through a field by a tractor or other vehicle behind a leading row of ripper shanks that are positioned to cut into the soil ahead of the electrically conductive stinger shanks. Electrical current flowing between adjacent stinger shanks passes through the soil and eradicates, by electrocution, the unwanted soil-borne pests. Each stinger shank has a wedge-shaped forwardly disposed front end. The stinger shanks and the ripper shanks are supported by a frame that also carries an electrical generator that supplies the current to the stinger shanks. The apparatus that is the subject of this patent publication is generally a significant improvement over the prior art apparatuses, particularly with regard to providing a durable, rugged and reliable soil pest eradication apparatus that is capable of providing broad and thorough eradication coverage deep into the soil.

While the soil-borne pest eradication apparatus that is described in the above-identified patent publication generally is an improvement over the prior art, it does have certain limitations, which are also present in the other prior art, that has also limited its full acceptance. As is known in the agricultural industry, soil conditions vary from one geographical area to another, from one field to another in the same area and even with a single field. Unfortunately, it has been found that the variances found in field conditions can significantly impact the use of electrical current to eradicate soil-borne pests. In fact, the present inventors have found that the use of electrical current to eradicate soil-borne pests is only fully effective when the amount of electrical current passed through the soil is adjusted to compensate for these soil conditions. Presently available eradicating apparatuses, as well as the methods and systems associated therewith, do not have the ability to compensate for the different soil conditions so as to optimize the amount of electrical current passing through the soil and, therefore, to more effectively and efficiently eradicate harmful soil-borne pests. Therefore, what is needed is an improved apparatus, method and system for passing electrical current through soil that takes into account the adjacent soil condition prior to discharging the electrical current. Preferably, the improved apparatus, method and system will automatically adjust the amount of electrical current that is discharged into the soil adjacent the electrically charged components so as to more effectively and efficiently eradicate the soil-borne pests.

SUMMARY OF THE INVENTION

The apparatus, method and system of the present invention provides the benefits and solves the problems identified above. That is to say, the present invention discloses an apparatus, method and system for eradicating soil-borne pests that includes an apparatus which is pulled through soil and utilizes variable controlled electrical current to eradicate the pests in the soil. The apparatus used with the method and system of the present invention has a leading row of ripper shanks that cut a path through the soil, a following row of electrically charged stinger shanks that discharge electrical current into the soil adjacent the stinger shanks and one or more soil probes disposed between the rows of ripper shanks and stinger shanks that connect to a voltage controller that beneficially controls the amount of electrical current to be discharged by the stinger shanks so as to provide more effective and efficient eradication of soil-borne pests. Utilizing the soil probe(s), the method and system of the present invention passes electrical current through soil in a manner that takes into account the condition of the soil that will be adjacent the stinger shanks prior to discharging the electrical current into that soil. In a preferred configuration of the present invention, the improved method and system comprises a voltage controller is operatively connected to the soil probe and the source of electrical current, such as a generator or the like, to automatically adjust the amount of electric current that is discharged into the soil adjacent the electrically charged stinger shanks so as to more effectively and efficiently eradicate the soil-borne pests without requiring continued adjustments by the operator of the method/system.

The apparatus, method and apparatus of the present invention provides a means to eradicate nematodes and other soil-borne organisms to a depth of several feet by means of specially shaped electrically conductive metal shanks that are pulled through the soil profile by a tractor or other vehicle. In one embodiment, the source of the electric current is a generator and transformer connected to each conductive shank. Electric current passes through the soil between the shanks resulting in the electrocution of unwanted soil borne pests, such as nematodes and the like.

One embodiment of the invention comprises a frame that supports two rows of downwardly pointing generally vertical parallel shanks. The leading row has a plurality of parallel ripper shanks and the trailing row has an identical number of parallel electrically-conductive stinger shanks. Each of the ripper shanks are configured to cut a path through the soil. Each stinger shank is positioned directly behind a corresponding ripper shank such that each stinger shank moves through the path made into the soil by the ripper shank. The shanks of both rows are separated by appropriate spacing which may be adjusted in order to provide the desired electrical charge through the soil based on the general anticipated quality, moisture and depth of the soil to be treated. The frame may be independently attachable or may be part of a larger trailer that is towed behind a towing means, such as a tractor or other vehicle, or it may be integrated into a self-propelled vehicle. Disposed between the row of ripper shanks and the row of stinger shanks is a probe row, which is also supported by the frame having one or more soil probes configured to measure the moisture content and/or other conditions of the soil. In a preferred embodiment, the probe row is configured such that there is one soil probe disposed between each pair of corresponding ripper shanks and stinger shanks. A voltage controller is electrically connected to each soil probe and to the source of electric current so as to read the data collected by the probe and adjust the amount of electric current that is directed to each stinger shank based on the soil conditions read by the soil probe to ensure that the amount of electric current discharged at the stinger shanks is optimized for the soil adjacent the stinger shanks.

As the apparatus travels through a field, the ripper shanks are pulled through the soil tearing open elongated rows or paths through the soil. The depth of the rows is directly related to the vertical length of the ripper shanks, and can range from several inches to several feet. The soil probes are pulled behind the ripper shanks through the cut path formed by the ripper shanks and electronically collect data regarding the condition of the soil. The electrically conductive stinger shanks are pulled through the loosened soil behind the probe row. The voltage controller reads the soil condition data and adjusts the amount of electric current that will flow to the stinger shanks based on that data. The electrical generator and transformer supply electric current to the stinger shanks to electrify the soil between each pair of adjacent stinger shanks, thereby killing any soil borne pests located in the soil. The generator and transformer may be located on the frame, tractor, trailer or any combination thereof. The amount of electric current will also be varied according to the spacing of the shanks, the degree of kill desired and the capacity of the generator and transformer. Pests may be eradicated from an entire field by passing the apparatus back and forth through the field.

The profile of the stinger shanks is of particular importance to the successful operation of the present invention. First, the front and bottom surfaces of the stinger shanks are pointed, allowing them to pass through the soil more smoothly. In addition, in a preferred embodiment, the stinger shanks are tapered from front to rear so that their cross-section is narrower in the front and gradually becomes wider toward the rear. Preferably, the tapering is more pronounced toward the bottom of the stinger shank. The tapering of the stinger shanks compresses the loosened soil between the stinger shanks as they pass through the soil. The soil compression allows more of the side surface areas of the stinger shanks to come into direct contact with the soil and, as a result, greatly facilitates the transfer of electricity into and through the soil. The conductive portions of the stinger shanks are separated from the frame using conventional non-conductive materials so as to reduce the likelihood of electrocution or other harm to the operator and/or other persons who may come into contact with the frame during operation of the method and system of the present invention.

In one aspect of the invention, the treatment of rows of planting berms between furrows is provided. In this aspect, the leading ripper shanks are eliminated and the stinger shanks are incorporated into inverted U-shaped structures that correspond to the cross-sectional shape of the rows of planting berms. The stinger shanks are positioned on each leg of the pair of legs of the inverted U-shaped structures so as to provide an electrical charge across the berm as the stingers travel down the row. In a preferred configuration of this embodiment, multiple U-shaped structures are provided on a single frame to treat several rows in a single pass through a field.

Accordingly, the primary aspect of the present invention is to provide an improved apparatus, method and system for eradicating soil-borne pests by introducing electric current into the soil that has the advantages discussed above and which overcomes the disadvantages and limitations associated with prior apparatuses, methods and systems of electrically eradicating such pests.

It is an important aspect of the present invention to provide an improved apparatus, method and system of introducing electric current into soil that results in broad and complete electrification of soils up to a depth of several feet in order to eradicate soil-borne pests such as nematodes and the like.

It is also an important aspect of the present invention to provide an improved apparatus, method and system of introducing electric current into soil to electrically eradicate soil-borne pests, with the apparatus being generally durable, rugged and reliable and having structures for tearing open the soil so as to provide a paths for soil probes that read the soil conditions and electrically conductive structures which introduce electric current into the soil.

It is also an important aspect of the present invention to provide an improved apparatus, method and system of introducing electric current into soil to electrically eradicate soil-borne pests, with the apparatus having specially shaped electrically conductive vertically oriented stinger shanks having pointed narrow leading edges and a tapered body of gradually increasing cross section for compression of soil between shanks for more complete electrification thereof.

It is also an important aspect of the present invention to provide an improved apparatus, method and system of introducing electric current into soil that utilizes one or more soil probes to measure the condition of the soil and a voltage controller electrically connected to the soil probe(s) to adjust the amount of electric current that is supplied to the electrically conductive components of an apparatus for eradicating pests so as to optimize the electrical current applied to the soil based on the condition of the soil.

Another important aspect of the present invention is to provide an improved apparatus, method and system of introducing electricity into soil that comprises a row of ripper shanks that rip a path through the soil, a row of soil probes aligned with the ripper shanks that move through the path and measure the condition of the soil therein, a row of stinger shanks that move through the path behind the probes to discharge electricity into the soil, a source of electricity and a voltage controller that is electrically connected to the soil probes and electricity source to adjust the amount of electric current that is supplied to the stinger shanks.

The above and other aspects and advantages of the present invention are explained in greater detail by reference to the attached figures and the description of the preferred embodiment which follows. As set forth herein, the present invention resides in the novel features of form, construction, mode of operation and combination of the above presently described and understood by the claims.

BRIEF DESCRIPTION OF THE DRAWINGS

In the drawings which illustrate the preferred embodiments and the best modes presently contemplated for carrying out the present invention:

FIG. 3 is a back perspective view of one of the stinger shanks of the apparatus of FIG. 2 shown attached to a section of the support frame thereof with a clamping mechanism;

FIG. 4 is a side perspective view of the stinger shank, frame and clamping mechanism of FIG. 3;

FIG. 10 is a flow diagram showing a method for eradicating soil-borne pests configured according to a preferred embodiment of the present invention.

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed text and drawings are merely illustrative of one or more preferred embodiments and, as such, disclose one or more different ways of configuring the present invention. Although specific components, materials, configurations and uses are illustrated, it should be understood that a number of variations to the components and to the configuration of those components described herein and in the accompanying figures can be made without changing the scope and function of the invention set forth herein. For instance, although the figures and description provided herein set forth certain components and configurations for those components of an apparatus for use with the method and system of the present invention, those skilled in the art will readily understand that this is merely for purposes of simplifying this disclosure and that the present invention is not so limited.

Figure 1:
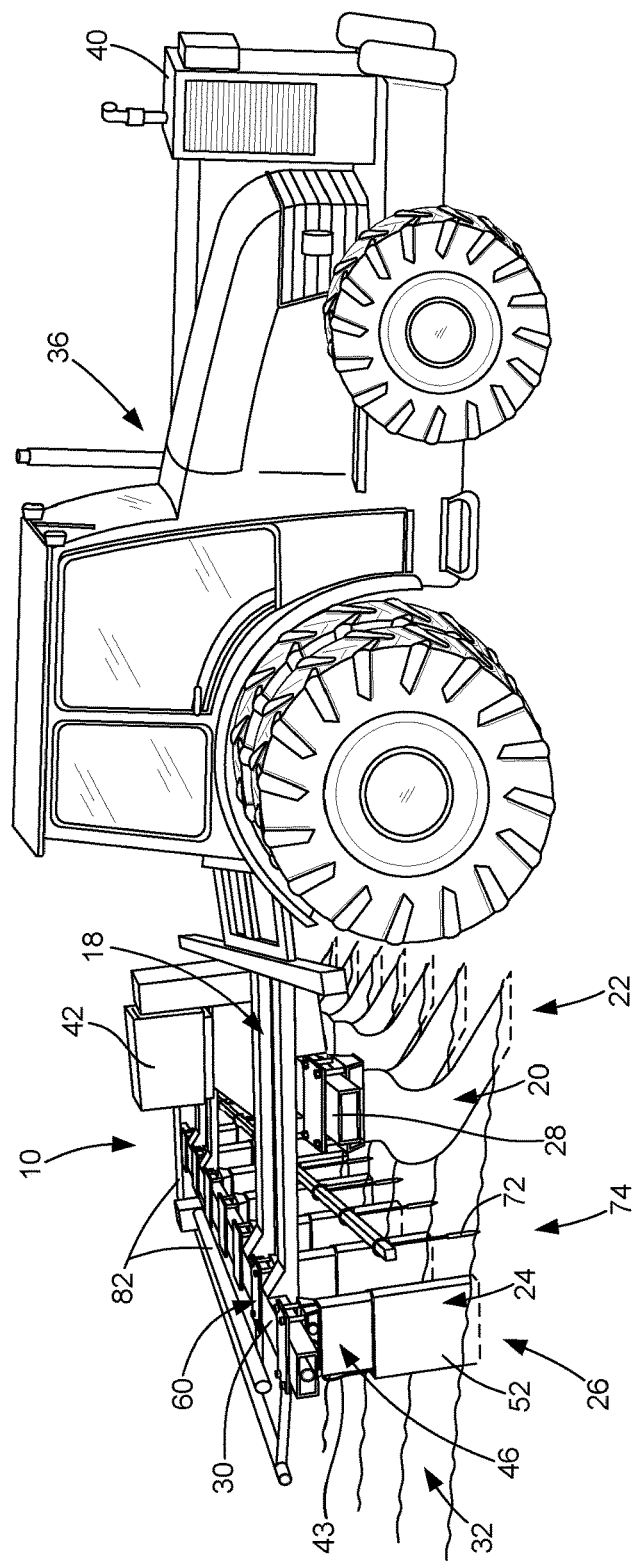
FIG. 1 is a side perspective view of one embodiment of an apparatus configured for use with the system and method of the present invention shown in use while being towed behind a tractor through an agricultural field.
Figure 2:
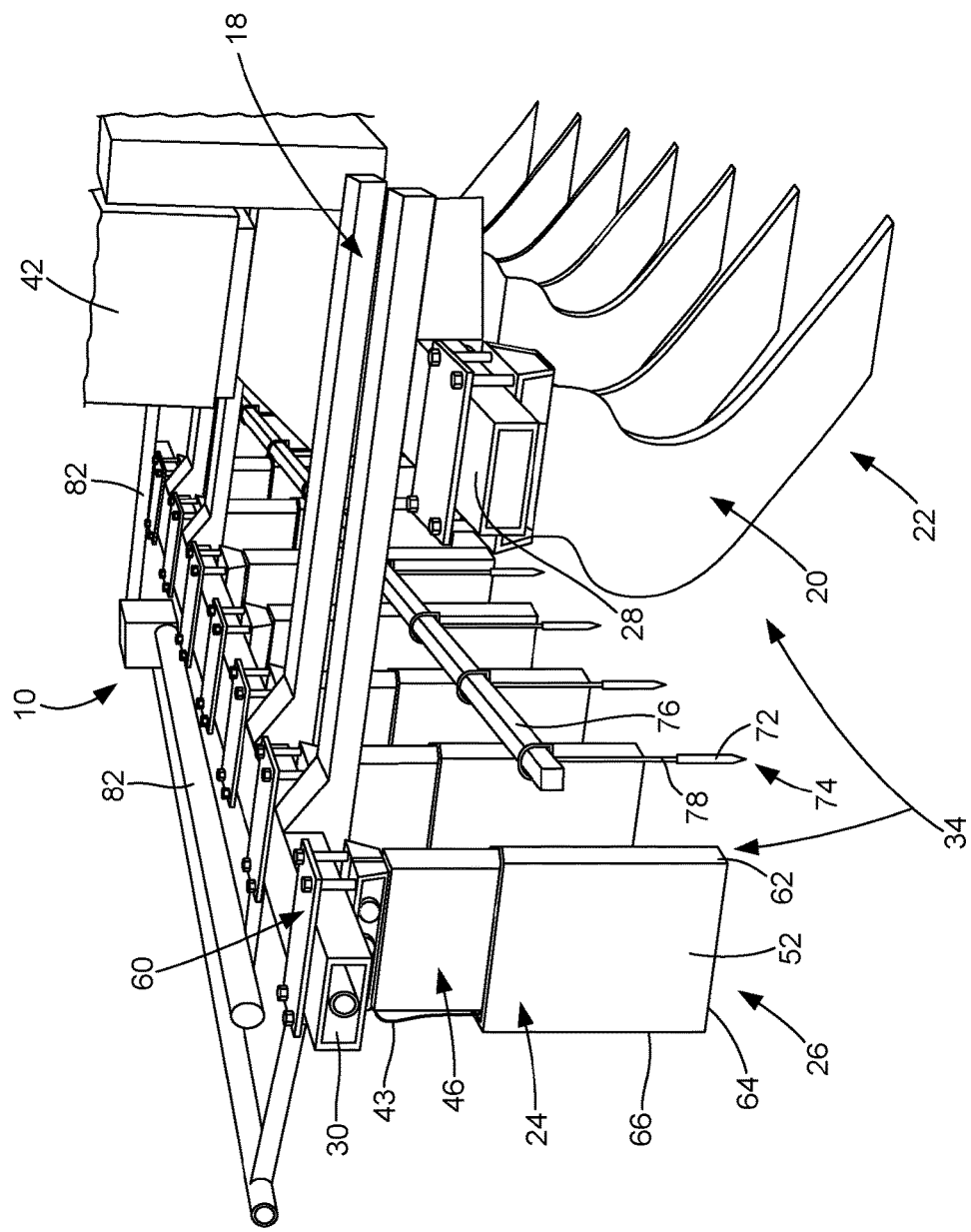
FIG. 2 is a side perspective view of the apparatus of FIG. 1 shown not in use.

An apparatus for discharging electricity into soil that is configured pursuant to one embodiment of the present invention is shown generally as 10 in FIGS. 1 and 2. As set forth in more detail below, the apparatus 10 is configured for use with the pest eradication system 12 shown in FIGS. 8 and 9 and with the method of pest eradication 14 shown in FIG. 10 to eradicate soil-borne pests from soil 16, as shown in use in FIG. 1, that may be in an agricultural field or other location. The soil-borne pests which can be beneficially eradicated by the system 12 and method 14 of the present invention include nematodes and other living organisms, including but not limited to grubs, gophers, snakes and the like that can limit or even prevent growth of crops that are grown in the soil 16. With regard to the use of the system 12 and method 14 to eradicate nematodes, the use of apparatuses to pass electricity through soil 16 is generally well known by those in the agricultural industry and has been used in place of toxic chemicals, some of which have been banned or are heavily regulated, such as methyl bromide and the like. The present invention provides an improved system 12 for and method 14 of applying electric current to the soil 16 to more effectively and efficiently remove the various soil-bearing pests. Typically, the system 12 and method 14 of the present invention will be applied to the soil 16 through an entire field before the field is planted with crop.

As will be readily appreciated by those skilled in the art, a variety of differently configured apparatuses can be utilized to apply electricity to the soil according to the system 12 and method 14 of the present invention. The present description sets forth a treating apparatus 10 which is believed to be particularly configured to beneficially accomplish the objectives of the system 12 and method 14. In a preferred configuration, the apparatus 10 generally comprises a frame 18 that supports a plurality of ripper shanks 20 disposed in a leading row 22 and a plurality of stinger shanks 24 disposed in a trailing row 26 that is positioned in spaced apart relation to leading row 22, as shown in FIGS. 1 and 2. Each of the ripper shanks 20 in leading row 22 are adjustably attached to a frame member 28 that defines the leading row 22 and each of the stinger shanks 24 are adjustably attached to a frame member 30 that defines the trailing row 26, as best shown in FIGS. 2 through 5. The ripper shanks 20 are configured to penetrate into soil 16 and loosen the soil 16 while providing a cut path, shown as 32 in FIG. 1, through the soil 16. The stinger shanks 24 are configured to impart electricity to the soil 16 to eradicate any pests living therein. As shown in FIGS. 1 and 2, each stinger shank 24 is positioned directly behind a corresponding ripper shank 20 to define a shank pair 34 such that each stinger shank 24 will be moved through the soil 16 in the cut path 32 formed by its corresponding ripper shank 20. In a preferred embodiment, the apparatus 10 will have a plurality of shank pairs 34 disposed width-wise across the frame 18, such as the seven shown in FIGS. 1 and 2. Positioning the stinger shanks 24 directly behind its corresponding ripper shank 20 prolongs the life of the stinger shanks 24 by not requiring the stinger shanks 24 to perform the function of ripping and loosening the soil. As will be readily appreciated by those skilled in the art, any number of ripper shanks 20 may be provided together with an identical number of stinger shanks 24. Fewer stinger shanks 24 may be employed than ripper shanks 20 if desired or appropriate given the soil conditions.

The apparatus 10 may be configured to be towed by a tractor 36 or other apparatus towing means that is configured and capable of dragging the apparatus 10 through the field in a manner that allows the ripper shanks 20 to cut the paths 32 through which the stinger shanks 24 will follow while they discharge electric current to the soil 16 to eradicate pests therein. Alternatively, apparatus 10 may be configured as part of another apparatus that is pulled through the field to perform additional tasks that will benefit the crops to be grown in the soil 16, configured as part of a trailer that is pulled by the tractor 36 or incorporated into a vehicle (such as tractor 36 or the like) as an integral unit. The configuration of any such unit will be substantially the same as that shown for apparatus 10 in the figures accompanying the present disclosure.

Supportedly carried by the frame 18 or the tractor 36 or otherwise associated with the apparatus 10 is a source of electricity 38 that is electrically connected to the stinger shanks 24 so as to provide electric current thereto that is then discharged to the soil 16. In the embodiment shown in FIGS. 1 and 2, the source of electricity 38 comprises an electrical generator 40 and a transformer 42 that are carried by tractor 36 and frame 18, respectively. Alternatively, electrical generator 40 and transformer 42 and may be mounted together or separately on the frame 18, on a trailer associated with the frame 18, on the tractor 36 or other vehicle pulling the apparatus 10. Appropriate insulated wiring, shown as 43 in FIGS. 1 and 3, is used to deliver electric current to the exterior conductive surfaces of the stinger shanks 24 in different phases, as discussed more fully below. In one embodiment, electrical generator 40 is a 440 volt DC generator and transformer 42 is a 300 amp transformer, thereby providing 4160 volts to be discharged into soil 16. A variety of different combinations of electrical generator 40 and transformer 42 can also be utilized as the source of electricity 38. Alternatively, the electrical generator can be a 4160 volt AC generator that connects directly to the stinger shanks 24 without the need for transformer 42. Different sizes of electrical generator 40 can also be utilized. Although the source of electricity 38 is shown in FIGS. 1 and 2 as being carried by the tractor 36 and frame 18, it may be more beneficial to have the entire source of electricity 38 be carried by the tractor 36 or other towing means.

Figure 6:
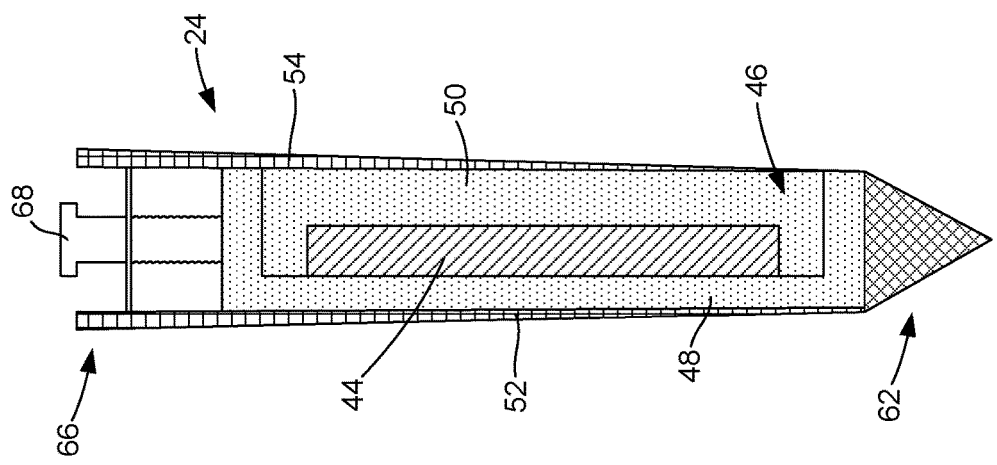
FIG. 6 is a cross-sectional top view of the stinger shank of FIG. 4 taken through the lines 6-6 of FIG. 4.
Figure 5:
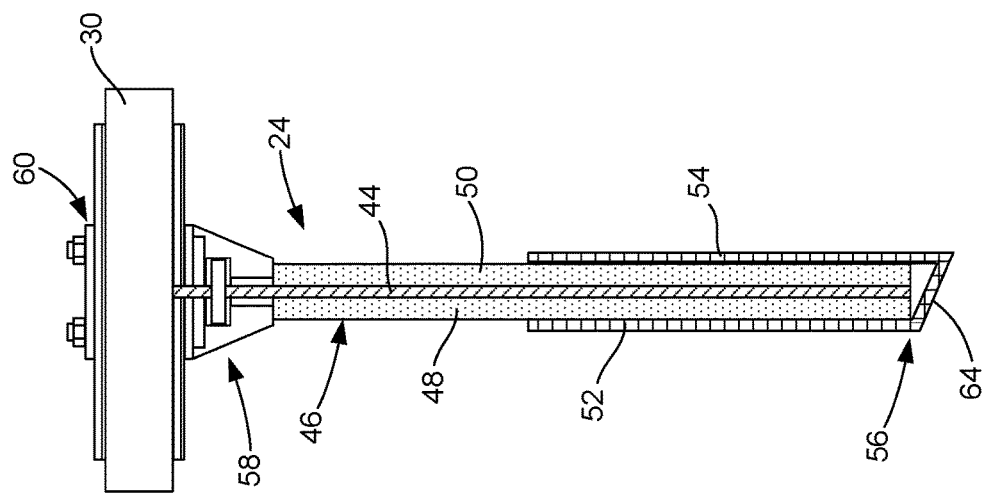
FIG. 5 is a cross-sectional back view of the stinger shank, frame and clamping mechanism of FIG. 3 taken through lines 5-5 of FIG. 3.

In a preferred configuration for apparatus 10, each stinger shank 24 is moveably attached to frame member 30 of frame 18 using a central support member 44, preferably made of steel, that is disposed inside insulated cover 46. In the embodiment shown in the figures, insulated cover 46 is defined by a two opposingly joined insulated members 48 and 50 that substantially encapsulate the central support member 44, as best shown in FIGS. 5 and 6. Conductive surfaces 52 and 54, which are preferably made out of a conductive metal or the like, are provided on the outside of the insulated members 48/50 towards the lower end 56 of the stinger shank 24 where the stinger shank will contact the soil 16, as shown in FIG. 5. Conductive surfaces 52 and 54 are attached to one of the outputs from the source of electricity 38. As can be seen in FIGS. 1 and 2, conductive surfaces 52/54 come into direct contact with the soil 16 to transfer the sterilizing electricity to the soil 16. The upper end 58 of the stinger shank 24 comprises a clamping mechanism 60 that securely clamps to the central support member 44 and to frame member 30 of frame 18 so as to support stinger shank 24 on the frame member 30. In the preferred embodiment, clamping mechanism 60 is of the type that allows the user to move the stinger shank 24 along frame member 30 without disengaging from the central support member 44 so the user of apparatus 10 can position the stinger shanks 24 relative to each other in a manner that is beneficial for treatment of the soil 16 to remove pests therefrom. One such configuration for the clamping mechanism 60 is shown in FIGS. 2 through 5. In a preferred embodiment, each of the ripper shanks 20 also utilizes the same clamping mechanism 60 to moveably clamp to frame member 28 of frame 18.

Both the ripper shanks 20 and stinger shanks 24 can be moved along their respective frame members 28/30 such that they are positioned thereon at a location that is beneficial for the eradication of pests from soil 16. As set forth above, the ripper shanks 20 and stinger shanks 24 of each shank pair 34 are aligned such that the ripper shanks 20 will cut a path 32 through the soil 16 along which the corresponding stinger shank 24 of the shank pair 34 will follow, as best shown in FIG. 1.

The leading edge 62 of each stinger shank 24 is tapered to a point so as to facilitate easy movement through the soil 16 behind the corresponding ripper shank 20, as best shown in FIGS. 2 and 6. Similarly, the bottom edge 64 of each stinger shank 24 is also tapered to a point, as best shown in FIG. 5. These pointed edges 62/64 generally perform a knife blade or plow function as the stinger shank 24 moves through the soil 16. In a preferred embodiment, the conductive surfaces 52/54 of each stinger shank 24 are mounted such that the overall width of the stinger shank 24 increases from the leading edge 62 to the trailing edge 66, as best shown in FIG. 6. Each stinger shank 24 forms a wedge that increases in size from front to rear (i.e., the leading edge 62 to the trailing edge 66). This wedge-shaped design compacts the soil 16 between the stinger shanks 24, which increases the soil density as the stinger shank 24 is pulled through the soil 16. This compaction increases conductivity of the electrical charge within the soil profile near the stinger shanks 24. The amount of width increase from the front to the rear of stinger shank 24 may be varied according to such things as the distance between stinger shanks 24, soil moisture, and other conditions. Adjustment may be accomplished using bolts 68, as best shown in FIGS. 3 and 6, or other connectors.

Figure 7:
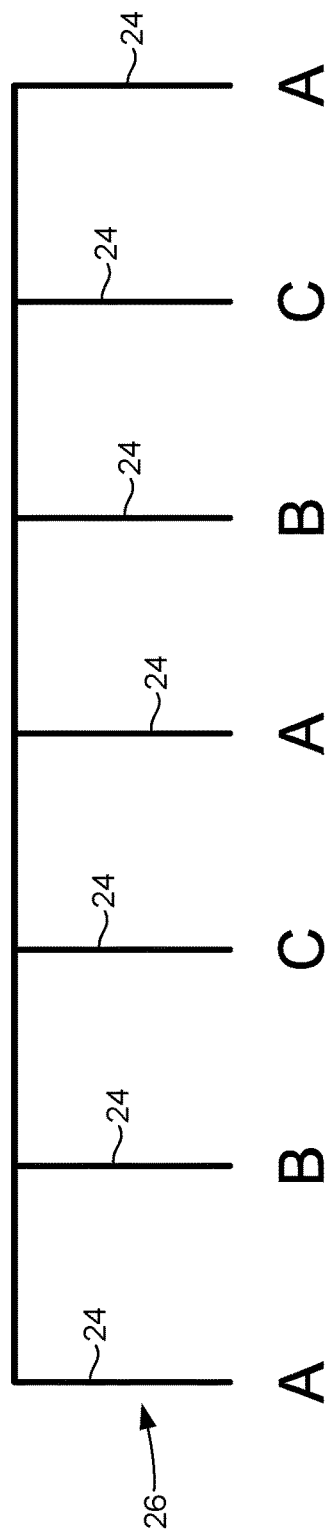
FIG. 7 is a diagrammatical representation of an embodiment having a series of seven stinger shanks showing the distribution of electrical phasing to the stinger shanks.

In the preferred embodiment, a standard three-phase generator 40 is utilized, although any suitable generator 40 having different phases may be employed with equal success. Using a three-phase generator, at least 3+1=4 stinger shanks 24 are required for deployment next to each other so that each of the phases may complete an electrical circuit through the soil (A-B-C-A). Current flows from the generator 40 between each of the three pairs of phases A-B, B-C, and C-A. Using the above 3+1 configuration, generator 40 may simultaneously provide current in all three phases, thereby continuously introducing electricity to the soil between each of the stinger shanks 24. Additional stinger shanks 24 may be added using a three-phase generator 40 in the pattern 3+3+1: A-B-C-A-B-C-A (see diagram of FIG. 7 showing a seven stinger shank 24 configuration. If a generator 40 having two phases is used, then the shank pattern for the stinger shanks 24 (as well as the ripper shanks 20, as set forth above) would be 2+1=3 (A-B-A), or 2+2+1 (A-B-A-B-A), etc. It is to be appreciated that the conductive panels 52/54 on both sides of each stinger shank 24 receive a charge in the same electrical phase, and that only the soil 16 between charged stinger shanks 24 will be electrified.

In an alternative embodiment, elongated stinger shanks 24 are employed. The upper portion of these individual stinger shanks 24 is the same as described previously, however an additional conductive lower portion can be provided that is attached to the bottom of the stinger shanks 24. The sides of lower portion are conductive and carry the same charge/phase as the conductive surfaces 52/54. The lower portion may have a more pronounced wedge shape in comparison with stinger shank 24, which may be adjusted according to soil conditions and the like using bolts 68. Longer ripper shanks 20 can also be utilized in such an embodiment, with the ripper shanks 20 having approximately the same length (depth) as the elongated stinger shanks. By way of example only, and without limiting the scope of the appended claims, in such an alternative embodiment, the entire shank may be thirty-six inches tall, although other dimensions may be used, with the upper stinger shank 24 being approximately 18 inches in length. The top portion viewed from a front profile may have a width of three inches at the leading edge 62 to three and one-half inches at the trailing edge 66. The bottom portion of the stinger shank 24 viewed from a front profile may have a width that varies from about three inches at the leading edge 62 to a range of between about five to about eight inches at the trailing edge 66. The width is adjustable using adjustment bolts 68 which act as wedges.

In another alternative embodiment, the apparatus 10 has a plurality of above-ground mound or berm shaping stinger shanks 24. In this embodiment, each stinger shank 24 is shaped in the form of an inverted U that is selected so as to follow the contour of an above-ground berm of soil 16 forming a row into which crops will be planted. The insides of each of the legs of the inverted U are made of electrically conductive material, and these surfaces touch the soil 16 on the sides of the berm such that a charge is provided across the berm as the stinger shank 24 passes across it. This provides for sterilizing the surface area of a berm prior to planting row crops. A plurality of the inverted U-shaped structures may be provided to treat several rows in a single pass.

The treatment of soil using the system 12 and method 14 of the present invention should be carried out prior to the planting of crops. The electrical energy from the stinger shanks 24 could potentially cause damage to existing plants and root systems. Because the mode of action to control pests is electricity, there are virtually no adverse effects on the soil 16. It is possible that beneficial soil microbes, which may also be eradicated by passing electricity through the soil 16, will need to be replenished due to killing of naturally occurring organisms while treating for nematodes and other harmful pests. The treatment of soil 16 using the system 12 and method 14 of the present invention is best performed when the soil 16 is moist in order to better conduct electricity through the soil 16. Thus, it is preferred that the treatment take place within a reasonably short time after a rain or after irrigation. In general, the more moisture in the soil 16, the more effective the treatment according to the system 12 and method 14 of the present invention will be.

The present inventors have found that the moisture content for most soil 16 should, typically, be between approximately 6% and 8% to obtain the most effective and efficient eradication of pests from soil 16 utilizing an apparatus 10 that is configured to pass electricity through the soil 16. If the soil 16 is dry, utilizing electric current to eradicate pests does not work well or, if too dry, not at all. If the soil 16 contains too much moisture, there will be too much conductivity and could result in electrical shock that could damage equipment and/or the soil 16 itself. In addition, the presence of too much salt in the soil 16 is also a problem. Although the amount of electric current that is discharged by the stinger shanks 24 may be able to be adjusted prior to beginning pest eradication in a particular field based on what are believed to be the soil conditions throughout the field, this does not allow the operator of the apparatus 10 to adjust the amount of electric current for localized soil conditions. To provide for automatic adjustment of electric current based on the localized condition of the soil 16, the present system 12 and method 14 include a soil condition determination means, shown as 70 on FIGS. 8 and 9, that monitors the condition of the soil 16 prior to applying electric current to the soil 16 and adjusts the amount of electric current sent to the stinger shanks 24 from the source of electricity 38. As shown in FIGS. 1 and 2, the apparatus 10 comprises one or more soil probes 72 disposed in a probe row 74 positioned between the ripper shanks 20 in the leading row 22 and the stinger shanks 24 in the trailing row 26. As with the ripper shanks 20 and stinger shanks 24, the soil probes 72 are mounted to and extend downward from a frame member 76 of frame 18. In a preferred embodiment, the soil probes 72 are moveably mounted on frame member 76 utilizing a clamping mechanism 60 that is configured to support the soil probes 72 below the frame member 76 and allow the operator of apparatus 10 to change the positioning of the soil probes 72 along the frame member 76, as shown in FIGS. 1 and 2. Clamping mechanism 60 may be of the same type utilized with the ripper shanks 20 and stinger shanks 24 or it may be of a different configuration taking into account the less weight of the soil probes 72 relative to the ripper shanks 20 and stinger shanks 24. In the embodiment shown, the soil probe 72 connects to the frame member 76 by way of an extension member 78 that positions the soil probe 72 sufficiently below the frame member 76 such that it will pass through the path 32 and contact the soil 16 that was opened by the ripper shanks 20.

Figure 8:
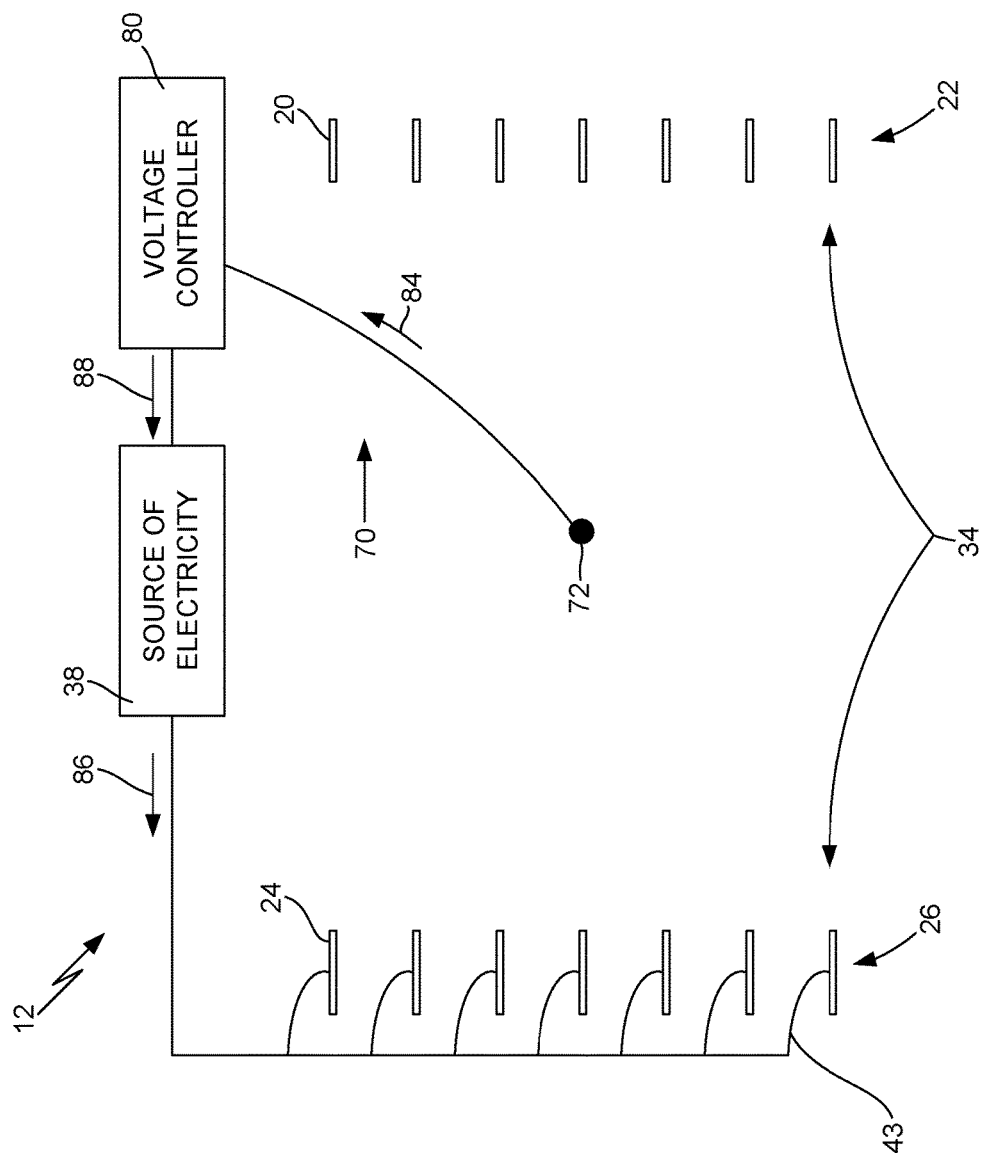
FIG. 8 is a diagrammatical representation of a system for eradicating soil-borne pests configured according to a first embodiment of the present invention showing use of a single soil probe in the probe row.
Figure 9:
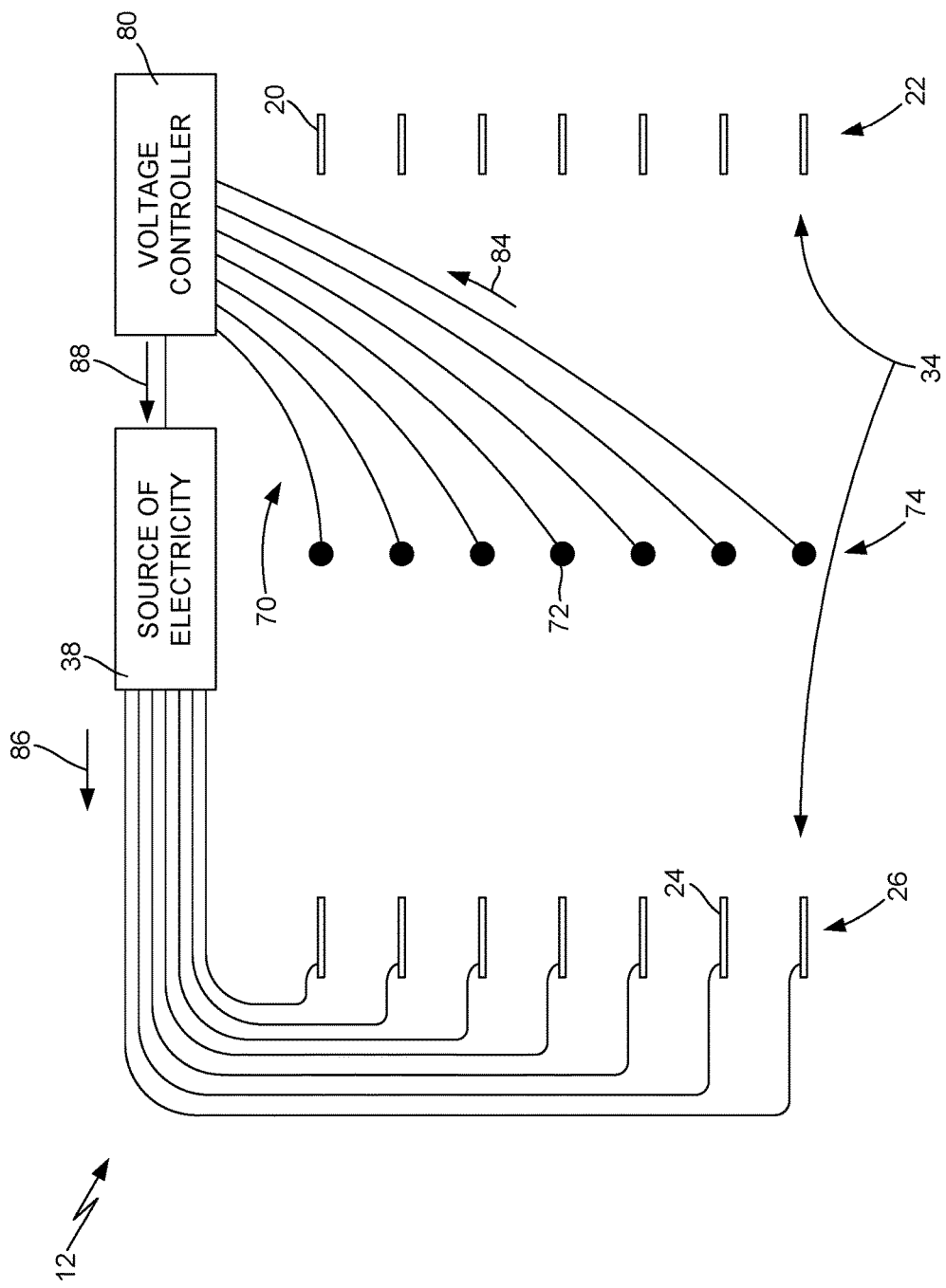
FIG. 9 is a diagrammatical representation of a system for eradicating soil-borne pests configured according to a second embodiment of the present invention showing use of multiple soil probes in the probe row, with one soil probe aligned with each pair of corresponding ripper shank and stinger shank.

The probe row 74 can contain a single soil probe 72, as shown with the embodiment of the system 12 of FIG. 8, or it may contain a plurality of soil probes 72, as shown with the embodiment of the apparatus of FIGS. 1 and 2 and the system 12 of FIG. 9. In the embodiment of FIG. 8 with the single soil probe 72, the soil probe 72 is preferably placed at or near the center (width-wise) of the probe row 74 between the leading row 22 and trailing row 26 so that soil probe 72 can best determine the condition of the soil 16. Although a single soil probe 72 may be placed on or toward one side or the other of apparatus 10, the center is believed to obtain the best representation of the condition of the soil 16 prior to discharging electric current from the stinger shanks 24. As set forth below, this single soil probe 72 will determine the conditions of the soil 16 for each of the stinger probes 24. Placement between the leading row 22 and trailing row 26 is best because that position is after the soil 16 has been cut open by the ripper shanks 20 and the path 32, which will allow the soil probe 72 to best determine the condition of the soil 16 and prevent excessive wear on the soil probe 72 if it was placed before the leading row 22. In a preferred configuration, the probe row 74 has a plurality of soil probes 72, preferably one for each corresponding shank pair 34 such that a soil probe 72 is positioned between the ripper shank 20 and stinger shank 24, resulting in soil probe 72 being disposed in a path 32 formed by each of the ripper shanks 20 directly ahead of its corresponding stinger shank 24, as shown in FIGS. 1, 2 and 9. As set forth below, in this configuration one soil probe 72 will determine the conditions of the soil 16 for a single stinger shank 24, providing more specific control of the amount of electricity from the source of electricity 38 that will be directed to each stinger shank 24. As will be readily appreciated by those skilled in the art, a lesser or greater number of soil probes 72 can be utilized in probe row 74 depending on the desired amount of control of the electricity directed to the stinger shanks 24. In any such configuration, each soil probe 72 should be in alignment with one of the ripper shanks 20 such that it will move through the path 32 formed thereby, as will the stinger shank 24 that follows behind the soil probe 72.

To control the flow of electricity to the stinger shanks 24 in the trailing row 26, the system 12 and method 14 of the present invention comprises a voltage controller 80 that is associated with apparatus 10 or tractor 36 (or any other towing or towable vehicle used with the system 12 and method 14). As best shown in FIGS. 8 and 9, the voltage controller 80 is electrically connected to the source of electricity 38, whether through a generator 40 directly or by way of transformer 42, and to each of the soil probes 72 in the probe row 74. Voltage controller 80 should comprise one or more programmable logic controllers or other computer control devices that is configured to send a signal to the source of electricity 38 to increase or decrease the output from generator 40 or transformer 42, as applicable, to the stinger shanks 24. If the soil conditions determined from a soil probe 72 shows low conductivity, then voltage controller 38 can increase the amount of electricity from the source of electricity 38 to the associated stinger shank 24, if each stinger shank 24 has a soil probe 72 associated therewith (as shown in FIGS. 1, 2 and 9) or to each of the stinger shanks 24 if only one soil probe 72 is utilized (as in FIG. 8). If the conductivity of the soil 16 is higher than anticipated, then the voltage controller 80 can reduce the amount electricity sent to the stinger shanks 24. In either use, the use of the soil probe 72 and voltage controller 80 will provide more consistent electric current to the soil 16 and will improve the effectiveness and efficiency of the system 12 and method 14 of the present invention. Additionally, use of the voltage controller 80 will ensure that the desired amount of electricity reaches the soil 16 around stinger shanks 24 to eradicate the pests while preventing overloading of the equipment generating the electricity. The soil probe 72 and voltage controller 80 should be selected such that they are capable of working together in the manner desired for the system 12 and method 14 of the present invention, namely that the soil probe 72 is of the type that can read the desired conditions of the soil 16 (such as moisture content, salt levels and the like) and the voltage controller 80 can read the signals from the soil probe 72, feed the signal through the programmable logic controller or the like therein and send a signal to the source of electricity 38 to control the amount of electricity sent to the stinger shanks 24. Although soil probes 72 capable of determining the conditions of the soil 16 are generally available, it may be more desirable and/or beneficial to custom manufacture the soil probes 72 so they are configured to determine the conditions of soil 16 most relevant to eradication of certain pests, such as nematodes or the like, and send signals to the voltage controller 80, which may also be custom manufactured.

While any suitable dimensions may be used, as another example, and without limiting the scope of the appended claims, central support member 44 may be constructed of one inch by ten inch cold rolled steel encased in two C-shaped insulated members 48/50 made of Ultra High Molecular Weight (UHMW) plastic or the like for insulation purposes. The dimensions of the plastic insulated members 48/50 that encase the central support member 44 may be, for example, about two inches thick by about thirty-two inches wide. The leading edge 62 of each stinger shank 24 may be constructed, for example, at about a 45 degree angle, although any suitable angle may be used. Leading edge 62 may be made of hard-faced, cold rolled steel. The bottom edge 64 is also angled. Silicone sealant may be applied at the top on the seam between the UHMW plastic insulated members 48/50 and the metal central support member 44 of the stinger shank 24 to prevent moisture access to the electrically conductive surfaces 52/54 and to prevent shorting between the central support member 44 and the frame 18. The bottom of the stinger shank 24 may have a removable drain to prevent moisture accumulation.

Any appropriate number of ripper shanks 20 and stinger shanks 24 may be employed, having a depth of several inches to several feet. By way of example only, and without limiting the scope of claims, the embodiment shown in FIGS. 1 and 2 includes two generally parallel rows, leading row 22 and trailing row 26, with the leading row 22 having seven ripper shanks 20 on frame member 28 of frame 18 and the trailing row 26 having seven stinger shanks 24 on frame member 30 of frame 18. With a seven shank pair 34s, the treated soil zone may be up to twelve feet wide and, for example, two feet deep with each pass through a field. This particular embodiment shows a fame 18 that is pulled through the soil 16 by a tractor 36. On tractor 36 is mounted a diesel-powered generator 40 and mounted on the frame 18 is the transformer 42. The frame 18 moveably supports the two rows 22/26 of shanks 20/24. The first row of seven ripper shanks 20 may be, for example, approximately one and one-quarter inches wide by thirty-three inches deep. The leading row 22 of ripper shanks 20 dig paths approximately two feet deep in the soil 16, through which the trailing row 26 of stinger shanks 24 pass through, by loosening and opening the soil profile. In one example, the trailing row 26 of stinger shanks 24 is approximately three feet behind the leading row 22 of ripper shanks 20. The stinger shanks 24 are connected to a generator 40 and transformer 42, with the generator 40 having, for example, a 480 volt output which is run through a multiplier transformer of, for example, 9.5 to 1, to produce 4160 volts at a maximum output of 200 amps at the stinger shanks 24. The transformer 42 is wired to the seven individual stinger shanks 24 using high voltage wire 43. In one embodiment, all electric cables are encased in PVC plastic pipe 82 between the generator, transformer, junction box and stinger shanks 24, as shown in FIGS. 1 and 2. In the embodiment of FIGS. 1 and 2, each individual stinger shank 24 is wedge-shaped and tapered, for example, from a width of about three inches at the leading edge 62 to about three and one-half inches at the trailing edge 66, as shown in FIG. 6. Other dimensions may be used depending on the soil and conditions, so long as the width increases from front to rear.

In one embodiment of the method 14 of the present invention, which is summarized in FIG. 10, the person wanting to eradicate soil-borne pests in soil 16 will select an apparatus 10 having a leading row 22 comprising a plurality of ripper shanks 20, a trailing row 26 comprising a plurality of stinger shanks 24, a probe row 74 comprising one or more soil probes 72 and a source of electricity 38, such as a generator 40 or a combination generator/transformer 40/42, such as the apparatus 10 shown in FIGS. 1 and 2. In the embodiment shown in FIGS. 1 and 2, with the apparatus 10 being a separate towable item, the user attaches the apparatus 10 to a towing means, such as tractor 36 and then positions the apparatus in field where the soil 16 is to be treated to eradicate soil-borne pests, such as nematodes and the like. With the tractor 36 operating and positioned in the field, the generator 40 is started to begin generating electricity therefrom and the ripper shanks 20 are dropped into the soil 16. The stinger shanks 24 are electrically activated from an operator control panel, typically located in the cab of tractor 36. The generator 40 is brought up to operating capacity and is activated by a magnetic switch wired to the transformer 42. Once at operating voltage, the tractor 36 begins moving the apparatus 10 through field at a slow pace, such as approximately one to one and one-half mph depending on the conditions of soil 16. The ripper shanks 20 penetrate the soil 16 to form a path 32 associated with each ripper shank 20, through which the soil probes 72 and stinger shanks 24 will follow. In the embodiment shown in FIGS. 1, 2 and 9, each shank pair 34 will have a corresponding soil probe 72 disposed between and path-ways aligned with the ripper shank 20 and stinger shank 24. In an alternative embodiment, only one soil probe 72 is utilized in probe row 74 to determine the soil condition applicable to all stinger shanks 24, as shown in FIG. 9. In that embodiment, the soil probe 72 will typically be positioned in one of the paths 32 at or near the center of apparatus 10. An initial electrical output from the source of electricity 38 will flow to the stinger shanks 24. As set forth above, during actual use of apparatus 10, the electrical output to the stinger shanks 24 will automatically be adjusted according to the relevant condition, such as moisture content and conductivity, of the soil 16. As also set forth above, the soil probes 72 utilized with the system 12 and method 14 of the present invention will be selected so as to be able to read the relevant soil conditions and send a reading signal, shown as 84 in FIG. 10, to the voltage controller 80 associated with the apparatus 10, typically by being mounted thereon or in the towing vehicle, such as tractor 36. The voltage controller 80 will process the reading signal 84 from the soil probe(s) 72, either a single soil probe 72 as shown in FIG. 8 or a plurality of soil probes 72 as shown in FIG. 9, to determine a quantity of electricity 86 needed by the stinger shanks 24 to efficiently and effectively eradicate the pests in the soil 16 and transmit a control signal 88 to the source of electricity 38 to output the quantity electricity 86 to the stinger shanks 24. The source of electricity 38 then transmits the quantity of electricity 86 to each of the stinger shanks 24, either collectively as shown in FIG. 8 or individually as shown in FIG. 9. Each stinger shank 24 will discharge the quantity of electricity 86 therefrom into the soil 16, generally in a plume that radiates outward from the outer sides and below the lower end 56 of each stinger shank 24 for at least several inches. Between each stinger shank 24, the electric charged plume will be at least substantially continuous.

In one configuration of the apparatus 10, the particulars of the various components may be: frame weight—7,500 pounds; generator weight—5,500 pounds (and 300 horsepower diesel motor); towing tractor requirement—200 horsepower, 4 wheel-drive; frame width—twelve feet; spacing between the ripper shank 20 and stinger shank 24—approximately twenty and one-half inches between centers; and spacing between shank base—17 inches.

The invention may not be applicable in soils with high organic matter such as peat moss because of the propensity for organic matter to catch fire. During field development trials, small wood residues from trees tended to spark and larger wood products caught between the stinger shanks 24 would sometimes ignite.

While there are shown and described herein one or more specific embodiments of the invention, it will be readily apparent to those skilled in the art that the invention is not so limited, but is susceptible to various modifications and rearrangements in design and materials without departing from the spirit and scope of the invention. In particular, it should be noted that the present invention is subject to various modifications with regard to any dimensional relationships set forth herein, with regard to its assembly, size, shape and use and with regard to the materials used in its construction. For instance, there are a number of components described herein that can be replaced with equivalent functioning components to accomplish the objectives of the present invention.

What is claimed is:

1. An apparatus for introducing electricity into soil to eradicate soil-borne pests, said apparatus comprising:
    a frame having a plurality of frame members;
    a leading row supported by said frame, said leading row having a plurality of downwardly pointing ripper shanks, each of said ripper shanks configured to cut a path through the soil;
    a trailing row supported by said frame behind said leading row, said trailing row having a plurality of downwardly disposed stinger shanks that each comprise at least one electrically conductive exterior surface, each of said stinger shanks being aligned with one of said ripper shanks so as to define a plurality of shank pairs therewith and to move through said path cut by said corresponding ripper shank;
    a source of electricity electrically connected to each of said stinger shanks so as to transmit a quantity of electricity thereto;
    a voltage controller electrically connected to said source of electricity and configured to select said quantity of electricity to be transmitted to each of said stinger shanks based on the condition of the soil; and
    a probe row supported by said frame between said leading row and said trailing row, said probe row having a soil probe configured to move through one of said paths formed by said leading row, read the condition of the soil in said path and transmit a reading signal to said voltage controller, said voltage controller further configured to receive and process said reading signal to automatically determine said quantity of electricity required to be transmitted to each of said stinger shanks to effectively and efficiently eradicate the pests by continuously discharging electricity from said source of electricity into the soil from said stinger shanks as said stinger shanks move through the soil.

2. The apparatus of claim 1, wherein said probe row comprises a plurality of said soil probes, each of said soil probes disposed in one of said paths between said ripper shank and said stinger shank of one of said shank pairs so as to be associated with one of said stinger shanks.

3. The apparatus of claim 1, wherein said soil probe continuously reads the condition of the soil between said leading row and said trailing row as said stinger shanks move through the soil so as to continuously adjust the quantity of electricity directed to said stinger shanks from said source of electricity.

4. The apparatus of claim 1, wherein each of said ripper shanks and said stinger shanks extend into the soil to a depth of at least eighteen inches.

5. The apparatus of claim 1, wherein said source of electricity supplies electricity to said stinger shanks in three phases A, B and C, and seven stinger shanks are provided and supplied with electricity in the phase pattern A-B-C-A-B-C-A.

6. The apparatus of claim 1, wherein each of said ripper shanks, said stinger shanks and said soil probes are moveably supported on said frame by a clamping mechanism.

7. A system for introducing electricity into soil to eradicate soil-borne pests, said system comprising:
    a leading row having a plurality of downwardly pointing ripper shanks, each of said ripper shanks configured to cut a path through the soil;
    a trailing row disposed behind said leading row and generally parallel therewith, said trailing row having a plurality of downwardly disposed stinger shanks, each of said stinger shanks having at least one electrically conductive exterior surface and being aligned with one of said ripper shanks so as to define a plurality of shank pairs therewith and to move through said path cut by said corresponding ripper shank;
    a source of electricity electrically connected to each of said stinger shanks so as to transmit a quantity of electricity thereto;
    a voltage controller electrically connected to said source of electricity and configured to select said quantity of electricity to be transmitted to each of said stinger shanks based on the condition of the soil; and
    a probe row disposed between said leading row and said trailing row, said probe row having a soil probe configured to move through one of said paths formed by said leading row, read the condition of the soil in said path and transmit a reading signal to said voltage controller, said voltage controller further configured to receive and process said reading signal to automatically determine said quantity of electricity required to be transmitted to each of said stinger shanks to effectively and efficiently eradicate the pests by continuously discharging electricity from said source of electricity into the soil from said stinger shanks as said stinger shanks move through the soil.

8. The system of claim 7, wherein said probe row comprises a plurality of said soil probes, each of said soil probes disposed in one of said paths between said ripper shank and said stinger shank of one of said shank pairs so as to be associated with one of said stinger shanks.

9. The system of claim 7, wherein said soil probe continuously reads the condition of the soil between said leading row and said trailing row as said stinger shanks move through the soil so as to continuously adjust the quantity of electricity directed to said stinger shanks from said source of electricity.

10. The system of claim 7, wherein each of said ripper shanks and said stinger shanks are sized and configured to extend into the soil to a depth of at least eighteen inches.

11. The system of claim 7, wherein said source of electricity supplies electricity to said stinger shanks in three phases A, B and C, and seven stinger shanks are provided and supplied with electricity in the phase pattern A-B-C-A-B-C-A.

12. The system of claim 7, wherein each of said ripper shanks, said stinger shanks and said soil probes are moveably supported on a frame by a clamping mechanism.

13. A method of introducing electricity into soil to eradicate soil-borne pests, said method comprising the steps of:
    a) selecting an apparatus having a leading row comprising a plurality of ripper shanks, a trailing row comprising a plurality of stinger shanks and a probe row comprising a soil probe, said trailing row disposed behind said leading row with each of said stinger shanks positioned in aligned relationship with one of said ripper shanks to define a shank pair, said probe row disposed between said leading row and said trailing row;
    b) positioning said apparatus on the soil to be treated and generating electricity from a source of electricity;
    c) moving said apparatus across the soil to form a path in the soil associated with each of said ripper shanks with said soil probe in one of said paths and one of said stinger shanks disposed in each of said paths, said soil probe configured to read the condition of the soil and send a reading signal to a voltage controller;
    d) processing said reading signal by said voltage controller to determine a quantity of electricity to eradicate the pests e) transmitting a control signal from said voltage controller to said source of electricity to produce said quantity of electricity for each of said stinger shanks;
f) transmitting said quantity of electricity to each of said stinger shanks; and
g) discharging said quantity of electricity into the soil from said stinger shanks to eradicate the pests.

14. The method of claim 13, wherein said probe row comprises a plurality of said soil probes, one of said soil probes associated with each of said shank pairs so as to determine the condition of the soil in each of said paths associated with said ripper shanks so as to transmit said reading signal to said voltage controller, said voltage controller further configured to receive and process said reading signal to determine said quantity of electricity required to be transmitted to each of said stinger shanks to effectively and efficiently eradicate the pests.

15. The method of claim 14, wherein said quantity of electricity is selected for each of said stinger shanks based on the condition of the soil determined by said soil probe disposed between shank pair associated with said stinger shank.

16. The method of claim 13, wherein the width of each of said stinger shanks is adjustable and said method further comprises the step of adjusting the width of said stinger shanks prior to said moving step.

17. The system of claim 13, wherein each of said ripper shanks, said stinger shanks and said soil probes are moveably supported on a frame by a clamping mechanism and said method further comprises the step of adjusting the position of each of said ripper shanks, said stinger shanks and said soil probes prior to said moving step.

18. The method of claim 13, wherein each of said ripper shanks and said stinger shanks are sized and configured to extend into the soil to a depth of at least eighteen inches.

19. The method of claim 13, wherein said source of electricity supplies electricity to said stinger shanks in three phases A, B and C, and seven stinger shanks are provided and supplied with electricity in the phase pattern A-B-C-A-B-C-A.

* * * * *